Dec. 12, 1967   W. L. MORRISON   3,357,585
FOAMED PLASTIC INSULATION
Filed Jan. 24, 1963

INVENTOR.
Willard L. Morrison
BY
Ooms, McDougall & Hersh
Att'ys

United States Patent Office 3,357,585
Patented Dec. 12, 1967

3,357,585
FOAMED PLASTIC INSULATION
Willard L. Morrison, Lake Forest, Ill., assignor to The Union Stock Yard and Transit Company of Chicago, Chicago, Ill., a corporation of Illinois
Filed Jan. 24, 1963, Ser. No. 253,695
1 Claim. (Cl. 220—9)

This invention relates to a container for the storage and shipment of perishable material at temperatures considerably below freezing temperature and it relates more particularly to a new and improved insulation system formed of a foamed plastic material wherein the heat transfer coefficient is materially improved to block the heat inflow or heat leaks into an insulated space maintained at a temperature below −40° F. and preferably at temperatures within the range of −100° F. to −300° F.

This application is a continuation-in-part of my copending application Ser. No. 12,559, filed Mar. 3, 1960, and entitled "Insulating Container," now Patent No. 3,093,259.

In the aforementioned copending application, description is made of an insulated container for use in the storage and shipment of perishable food and the like products at temperatures far below freezing temperature and preferably at sub-freezing temperatures obtained by rapid freezing with liquid nitrogen to temperatures as low as −320° F.

The described container is formed of interfitting insulation panels comprising a core of foamed plastic enclosed within a closely fitting envelope of a gas-tight material of the type that does not materially change its characteristics or become embrittled when exposed to temperatures as low as −320° F. A suitable material for use as the foamed core of the insulation is described as foamed plastic such as foamed polystyrene which may use Freon or other gaseous component for the development of the porous construction in the foamed plastic. While other foamed systems and insulation materials are described, such as air foamed plastics, balsa wood and the like, plastics formed with Freon to provide an insulation with discontinuous pores have been found to provide an unexpectedly high degree of thermal insulation at the temperature conditions existing in the storage and shipment of perishable materials at the extremely low sub-freezing temperatures described.

Thus it is an object of this invention to produce and to provide a method for producing an insulation system for containers and the like which provide preferential use as extremely low temperature insulation and it is a related object to provide an insulation system of the type described which enjoys greater efficiency as an insulation when exposed to extremely low temperatures.

It is another object to produce a container having new and improved insulation to minimize heat leaks into the container when at temperatures below −40° F.

These and other objects and advantages of this invention will hereinafter appear and for purposes of illustration, but not of limitation, an embodiment of the invention is shown in the accompanying drawing in which FIG. 1 is a cross-sectional view of an insulation panel embodying the features of this invention;

Figure 1:
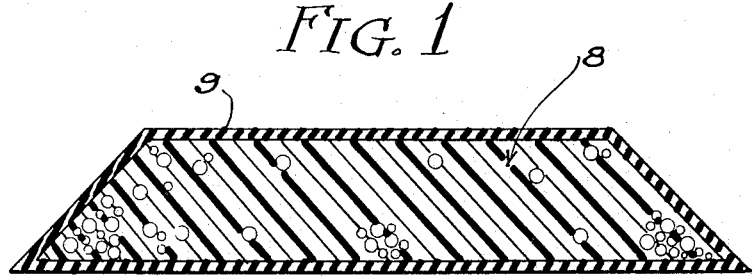
Figure 2:
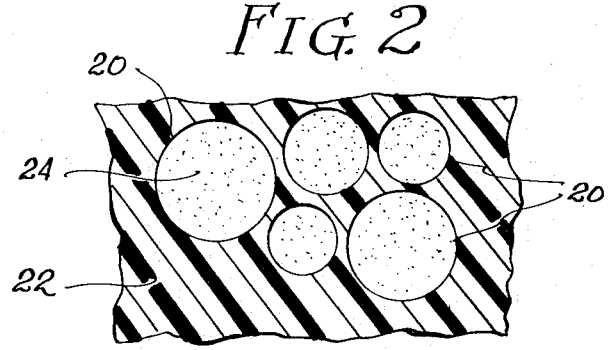
FIG. 2 is an enlarged sectional elevational view of the appearance of the panel at ambient temperature.
Figure 3:
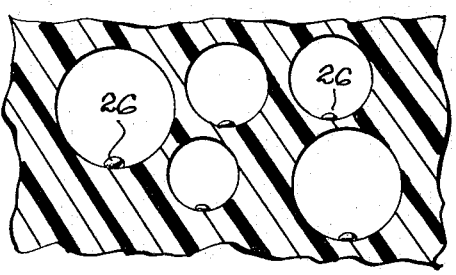
FIG. 3 is a sectional view similar to that of FIG. 2 showing the appearance of the panel at sub-freezing temperatures of use.
Figure 4:
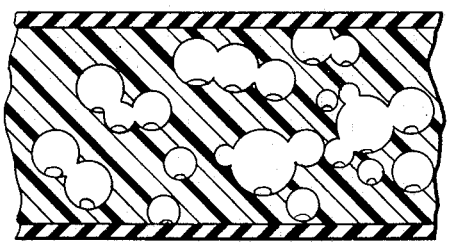
FIG. 4 is a sectional elevational view of a further modification of an insulation panel embodying the features of this invention.

The insulation panel of this invention is of the type which is formed of a synthetic resinous or elastomeric material which is substantially fluid and vapor impervious and which is formed to provide discontinuous pores 20 having a pore forming agent which is gaseous at ambient temperatures down to about −40° F. but which condenses to form a liquid at sub-freezing temperatures, such as at temperatures below about −40° F. down to the boiling point temperature of liquid nitrogen at atmospheric pressure or about −320° F.

As the foamed plastic or resinous component 22, it is desirable to make use of a resinous material which is not embrittled at the extremely low temperature described down to −320° F. and below and which has sufficient structural strength and dimensional stability to maintain its shape and porous structure for supporting the load of material resting upon its walls when used as a structural insulation wall of a storage or shipping container and to resist deformation responsive to vacuum conditions existing within the cells 20 constituting the pores of the foamed insulation. For this purpose, use can be made of polystyrene, polyurethane, polypropylene and the like foamable resinous materials.

As the foaming agent use can be made of Freon 12 or the like fluorinated or chlorofluorinated hydrocarbons or other liquid which is converted to the gaseous phase at temperatures above about −40° F. and which condenses to the liquid phase when reduced in temperature to sub-freezing temperatures such as below −40° F. When the plastic material is foamed with Freon 12 or the like material of the type described, the plastic becomes foamed to form a highly porous insulation panel upon conversion of the entrapped foaming material from a liquid phase to the gaseous phase while distributed throughout the hardenable resinous plastic material to form discontinuous pores. While in the vapor phase 24, the foaming agent remains in the foamed plastic to fill the pores to provide the desired insulation structure.

However, when the insulation system is exposed to temperatures below the condensation temperature for the Freon or other suitable foaming agent, the vapor component filling the pores becomes condensed to the liquid 26 under the conditions of use. Upon condensation, the gaseous phase is reduced in volume by about 1/600 of the volume originally occupied by the vapor phase whereby the Freon vapor in each of the cells is reduced to the liquid 26 with concurrent creation of a high volume in each cell. By reason of the disconnected pores 20 and the relative fluid and vapor imperviousness of the resinous material defining the pores or cells, the condensed liquid is retained in the cells and the vacuum conditions are maintained to provide a further decrease in the heat transfer coefficient of the insulation system responsive to the use at this low temperature.

Such super-insulation characteristics will be maintained substantially throughout the period of time that such sub-freezing temperatures are maintained within the insulated space. When the refrigerated conditions are no longer to be maintained and the temperature conditions are allowed to rise above condensation temperature for the foaming material entrapped within the cells of the insulation, the entrapped foaming liquid 26 is reconverted to the vapor phase 24 to relieve the vacuum conditions existing within the cells by refilling the cells with such vapor.

While it is preferred to make use of a porous insulation system of the type described having disconnected pores or cells for the entrapment of the foaming material condensed in the cells, beneficial results can be experienced in the use of a porous insulation system having connected pores but when the foamed insulation panel 8 is enclosed within a sealing envelope 9 of the type described in the aforementioned copending application. Under such conditions, the envelope 9, formed of a fluid and vapor impervious material such as synthetic rubber ("Ediprene") and the like, will serve to entrap the vapors of the foaming material. Thus when the panel is exposed to the low temperatures of the insulated space, the entrapped foamable material in the vapor phase will be condensed to the liquid phase with the corresponding reduction in the amount of space occupied, as heretofore described, to introduce vacuum conditions within the entire space enclosed by the envelope. This will operate to urge the envelope into close fitting relation with the enclosed foamed plastic material and to improve the thermal insulating characteristics of the resulting panel by reason of the vacuum conditions existing throughout.

It will be understood that the concepts described are capable of being practiced with liquids capable of use for foaming the plastic materials wherein the liquid and the plastic embody the characteristics of the type heretofore described in that the plastic will maintain sufficient strength and dimensional stability to maintain the cells while in an evacuated state while the foamable material will have a vapor phase filling the pores at ambient temperatures or slightly below and a condensed phase to generate evacuated conditions within the insulated panel at the extremely low temperatures of use.

It will be understood that other changes may be made in the details of construction, arrangement and operation, without departing from the spirit of the invention, especially as defined in the following claim.

I claim:

In an insulated container, an insulation system formed of a core of a rigid, porous, foamed synthetic resinous material having connected pores, a fluid and vapor impervious envelope enclosing the core of foamed synthetic resinous material in sealing relation and a fluid selected from the group consisting of fluorinated and chlorofluorinated hydrocarbon within the enclosed core of foamed synthetic resinous material which is in its condensed liquid state at temperatures below about $-40°$ F. and present in the gaseous phase at temperatures above about $-40°$ F. and which is present in an amount to fill the pores of the foamed plastic when in the gaseous state and to fill only a small fraction of the pores when in the condensed liquid state whereby vacuum conditions will exist within the enclosed core when the fluid is in its condensed liquid state.

References Cited

UNITED STATES PATENTS

| | | | |
|---|---|---|---|
| 2,450,436 | 10/1948 | McIntire | 260—2.5 |
| 2,576,977 | 12/1951 | Stober | 260—2.5 |
| 2,577,743 | 12/1951 | DeLong | 260—2.5 |
| 2,779,066 | 1/1957 | Gaughler. | |
| 2,848,427 | 8/1958 | Rubens | 260—2.6 |
| 2,848,428 | 8/1958 | Rubens | 260—2.5 |
| 2,884,386 | 4/1959 | McMillan et al. | 260—2.5 |
| 2,939,811 | 6/1960 | Dillon. | |
| 2,961,116 | 11/1960 | Jeppsen | 220—9 |
| 3,011,217 | 12/1961 | Carlson | 260—2.5 |
| 3,026,272 | 3/1962 | Rubens et al. | 260—2.5 |
| 3,026,273 | 3/1962 | Engles | 260—2.5 |
| 3,026,274 | 3/1962 | McMillan et al. | 260—2.5 |
| 3,091,946 | 6/1963 | Kasling | 220—9 X |
| 3,106,307 | 10/1963 | Morrison | 220—9 |

THERON E. CONDON, *Primary Examiner.*

MURRAY TILLMAN, *Examiner.*

M. FOELAK, G. E. LOWRANCE, *Assistant Examiners.*